Oct. 31, 1933.    J. COLLINS    1,932,882
LEAD PIPE FERRULE
Filed May 6, 1932
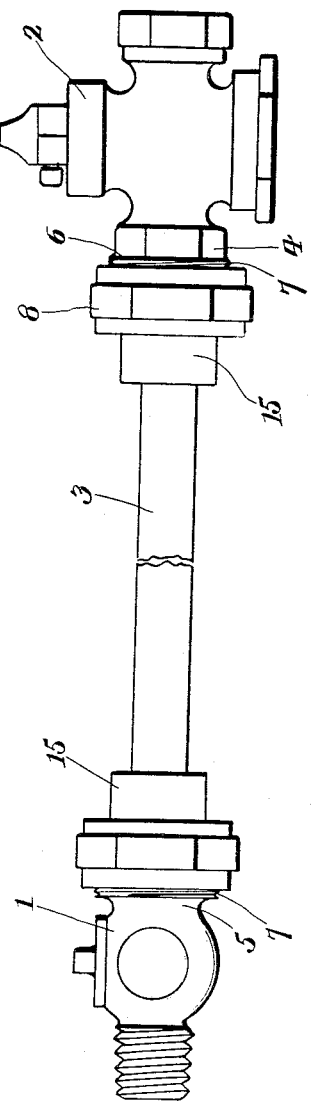
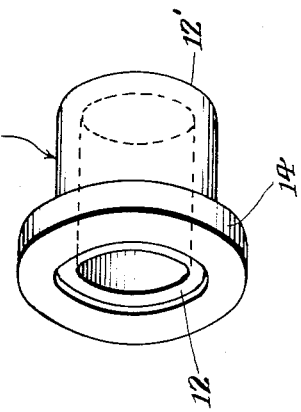
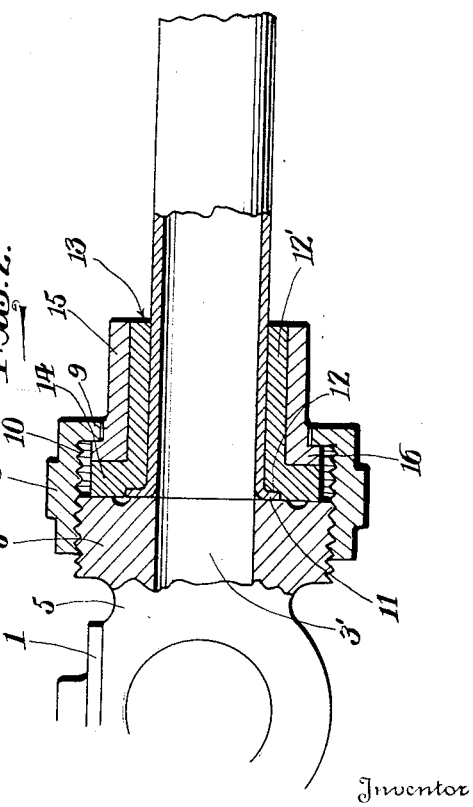
Inventor
James Collins
By Geo. P. Kimmel
Attorney Patented Oct. 31, 1933

1,932,882

UNITED STATES PATENT OFFICE 1,932,882

LEAD PIPE FERRULE

James Collins, Columbus, Ohio

Application May 6, 1932. Serial No. 609,727

1 Claim. (Cl. 285—120)

This invention relates to a lead pipe ferrule designed for use in connection with the replacement of pipes employed when repairing municipal water supply lines, and has for its primary object to materially reduce the cost of upkeep and a saving in fittings with respect to supply lines of the class referred to.

As is well known a municipal water supply line includes what is termed a municipal or corporation cock which is secured into the wall of the main water line and what is termed a municipal or corporation stop cock at the curb line to which the house line is connected. The cocks when originally installed are connected together by a lead pipe. Further that the work of the municipality or corporation in conveying water to the premises ends at the curb. Up to recent date, lead pipe has been used in conveying water from the main line to the curb. After a period of use the lead pipe becomes impaired, due to the wall thereof becoming coated with lime or other hard sediment. Further it is well known that upon certain conditions lead pipe has become granulated or disintegrated within three or four years. When the lead pipe becomes impaired, granulated or disintegrated, removal thereof is required and a new pipe substituted. The foregoing conditions have led to a substitution of a copper pipe when replacing a lead one. Since the copper pipe, because of having thinner walls, is much smaller in outer diameter than that of the lead pipe, it cannot be employed in connection with the cock on the main water line and at the stop cock at the curb, whereby the substitution of the copper pipe results in the abandonment of such cocks at a material loss to the municipality or corporation.

In abandoning the cocks, the municipality or corporation leaves the cock in the main line and throws the stop cock into junk and new cocks are substituted. A new tap is made in the main line alongside of the cock secured thereto, the latter being left connected to the line and a new cock connected in the tap, as well as a new stop cock arranged at the curb, the cocks being of the necessary size to fit the replacement, the latter being a copper pipe of less diameter than the removed lead pipe.

To enable the use of the originally installed main line cock and curb stop cock when replacing a copper pipe for a removed lead pipe, and to save the work and labor of ground excavating as is now required when new cocks are installed to have fitted thereto the copper pipe is the aim of this invention and which is attained by the employment of a ferrule of the form as hereinafter referred to.

A further object of the invention is to provide, in a manner as hereinafter set forth, a ferrule for the purpose referred to for providing a water-proof joint holding against any pressure from the line without the employment of a gasket, washer, solder or hot metal.

The invention further aims to provide, in a manner as hereinafter set forth, a lead ferrule for the purpose referred to which is simple in its construction, strong, durable, compact, thoroughly efficient when used, conveniently installed or applied and comparatively inexpensive to manufacture.

To the above ends essentially and others which may hereinafter appear, the invention consists of the construction of a ferrule falling within the scope of the invention as claimed.

In the drawing:—

Figure 1 is an elevation of a main line cock, a curb stop cock, a copper pipe connection between said cocks and the adaptation of a pair of ferrules, in accordance with this invention with respect to said pipe and cocks.

Figure 2 is a fragmentary view in longitudinal section illustrating the adaptation of the ferrule with respect to one end of the copper pipe and main line cock.

Figure 3 is a perspective view of the ferrule.

In the drawing, a main line cock and a curb stop cock are indicated at 1, 2 respectively. Extending from one cock to the other to register with the outlet of the cock 1 and intake of cock 2 is a copper pipe 3 which has been substituted for an impaired lead pipe (not shown) which was arranged between the cocks or installed with cocks 1, 2 at the time of installation of the latter. The outlet of cock 1 is shown and indicated at 3'. The intake for cock 2 is not shown, but the extension on cock 2 which provides the intake is shown and indicated at 4. The extension on cock 1, which provides outlet 3' is designated at 5 and is constructed in the same manner as extension 4 on cock 2. Each of the extensions has an enlarged peripherally threaded outer portion 6. Threads on portions 6 are designated 7.

Associated with each enlarged portion 6 is an interiorly threaded coupling collar 8 having an inwardly extending annular flange 9 at its outer end. The collars 8 are oppositely disposed with respect to each other. The threads on the inner face of each sleeve are designated 10.

The pipe 3 at each end, only one end being shown is formed with an outwardly directed annular flange 11. Each end flange 11 is for seating in a rabbet 12 formed in the inner end of the cylindrical body part 12' of the ferrule 13. The rabbet 12 borders the inner face of body part 12'. An outwardly directed annular flange 14 is provided at the inner end of body part 12' and the flange 14 preferably is of greater thickness than that of said body part and the latter is open at each end. The inner face of flange 11 is flush with the inner face of flange 14 when the pipe 3 and a ferrule 13 are coupled together.

A flanged sleeve 15 is mounted in encompassing relation with respect to body part 12'. The flange on sleeve 15 is designated 16, is of annular form and extends from the inner end of the sleeve. The flange 16 abuts the outer face of flange 14. The outer end of sleeve 15 is flush with the outer end of body part 12' of the ferrule. The edges of flanges 14 and 16 are flush with each other. The pipe 3 and flange 14 abuts the outer end of an extension 4 or 5. The diameter of flange 14 or 16 is less than the diameter of the outer end of extension 4 or 5. The flange 16 has its outer face engaged by flange 9 of a collar 8 when one end of pipe 3 and a ferrule 13 is coupled to an extension 4 or 5. The flanged collar 8 in connection with the flanges 11, 14 and 16 provide for a water tight joint between one end of pipe 3 and one of the cocks and such joint is obtained without the use of gaskets, washers, solder or hot metal.

What I claim is:—

In combination, a corporation cock having a peripherally threaded tubular extension formed with a flat outer end edge, a pipe having its inner diameter corresponding to the inner diameter of said extension and its outer diameter materially less than the outer diameter of said extension, said pipe having one end provided with an outwardly directed flat annular flange seated against said end edge, a lead ferrule including a body part of greater thickness than the body part of the pipe, snugly encompassing the latter, having one end edge seating against said flange and provided with an outwardly directed annular flange overlapping and enclosing said pipe flange and bearing against said outer end edge, said ferrule flange being of greater thickness and width than the thickness of the body part of the ferrule and of materially less length than the body part of the latter, a sleeve mounted on the body part of the ferrule and formed with an outwardly extending flange abutting the flange of the ferrule, the outer diameter of the sleeve being less than the outer diameter of said extension, and a flanged collar having its flange bearing against the flange of the sleeve, said collar adjustably and threadedly engaging with said extension for clamping the pipe flange and ferrule flange against said flat outer end edge.

JAMES COLLINS.